US 6,641,197 B1

(12) United States Patent
Hobson et al.

(10) Patent No.: US 6,641,197 B1
(45) Date of Patent: Nov. 4, 2003

(54) SUN VISOR ASSEMBLY HAVING A ROUNDED EDGE

(75) Inventors: James (Jud) Hobson, Jonesville, MI (US); Glenn Snyder, Quincy, MI (US)

(73) Assignee: Crotty Corporation, Quincy, MI (US)

( * ) Notice: Subject to any disclaimer, the term of this patent is extended or adjusted under 35 U.S.C. 154(b) by 0 days.

(21) Appl. No.: 10/010,538

(22) Filed: Dec. 7, 2001

Related U.S. Application Data

(63) Continuation-in-part of application No. 09/761,445, filed on Jan. 17, 2001, now abandoned, which is a continuation-in-part of application No. 09/515,315, filed on Feb. 29, 2000, now Pat. No. 6,302,467.

(51) Int. Cl.[7] .................................................. B60J 3/00
(52) U.S. Cl. ...................................... 296/97.1; 296/97.5
(58) Field of Search ............................... 296/97.1, 97.2, 296/97.5, 97.11, 97.12, 97.13; 29/402.08; 264/45.4

(56) References Cited

U.S. PATENT DOCUMENTS

| | | | | |
|---|---|---|---|---|
| 2,506,689 A | * | 5/1950 | Simpson et al. ............. | 296/97.1 |
| 3,542,416 A | * | 11/1970 | Nelson ........................ | 296/97.1 |
| 3,827,748 A | * | 8/1974 | Herr et al. ................... | 296/97.1 |
| 4,163,579 A | * | 8/1979 | Mahler et al. ............... | 296/97.1 |
| 4,477,116 A | * | 10/1984 | Viertel et al. ................ | 296/97.1 |
| 4,494,789 A | | 1/1985 | Flowerday ................. | 296/97 H |
| 4,576,409 A | | 3/1986 | Ebert ........................... | 296/97.1 |
| 4,664,435 A | * | 5/1987 | Dietz et al. .................. | 296/97.1 |
| 4,763,946 A | | 8/1988 | Evans et al. ................ | 296/97 H |
| 4,810,023 A | * | 3/1989 | Kawada ...................... | 296/97.8 |
| 4,952,008 A | * | 8/1990 | Lobanoff et al. ............. | 29/91.1 |
| 4,998,765 A | | 3/1991 | Van Order et al. ......... | 296/97.11 |
| 4,998,767 A | * | 3/1991 | Lawassani et al. .......... | 296/97.1 |
| 5,007,532 A | | 4/1991 | Binish ......................... | 296/97.1 |
| 5,031,951 A | | 7/1991 | Binish ......................... | 296/97.1 |
| 5,042,867 A | | 8/1991 | Crotty, III et al. .......... | 296/97.8 |
| 5,205,639 A | * | 4/1993 | White et al. ................ | 296/97.2 |
| 5,308,136 A | * | 5/1994 | Schwarz et al. ............. | 296/97.1 |
| 5,308,137 A | * | 5/1994 | Viertel et al. ................ | 296/97.1 |
| 5,327,633 A | * | 7/1994 | Riddle, Jr. ................. | 29/402.08 |
| 5,338,082 A | * | 8/1994 | Miller ......................... | 296/97.1 |
| 5,365,416 A | * | 11/1994 | Peterson ..................... | 296/97.5 |
| 5,454,616 A | * | 10/1995 | Aymerich et al. ........... | 296/97.1 |
| 5,466,405 A | * | 11/1995 | Viertel et al. ................ | 264/45.4 |
| 5,538,311 A | * | 7/1996 | Fusco et al. ................. | 296/97.5 |

(List continued on next page.)

FOREIGN PATENT DOCUMENTS

| | | | |
|---|---|---|---|
| BE | 554659 | | 1/1960 |
| DE | 3441177 | * | 5/1986 |
| EP | 275903 | * | 7/1988 |
| EP | 0340195 | * | 11/1989 |
| EP | 0530740 | * | 3/1993 |
| EP | 0562085 | * | 9/1993 |
| EP | 0612636 | * | 8/1994 |
| FR | 1222766 | | 1/1959 |
| JP | 62-173315 | * | 7/1987 |
| JP | 63-41234 | * | 2/1988 |
| JP | 63-166622 | * | 7/1988 |

Primary Examiner—Kiran Patel
(74) Attorney, Agent, or Firm—Rader, Fishman & Grauer, PLLC

(57) ABSTRACT

A sun visor assembly having a core member comprising an integral visor clip assembly. The sun visor is formed from either a substantially flat foundation that is folded unto itself, thereby forming two foundation halves, or from a pair of discreet foundation halves. The edge of the foundation, whether it comprises a single member folded unto itself or a pair of discreet halves, is shaped to correspond to the visor clip assembly, such that the foundation does not have to be cut-out to accommodate the visor clip assembly. This obviates the need to stretch and pull the upholstery cover through cutout portions in the foundation, thereby leading to a more efficient and less complex assembly of the sun visor.

2 Claims, 17 Drawing Sheets

U.S. PATENT DOCUMENTS

| | | | |
|---|---|---|---|
| 5,556,154 A | * | 9/1996 | Vaxelaire .................... 296/97.1 |
| 5,580,118 A | * | 12/1996 | Crotty, III .................. 296/97.1 |
| 5,601,766 A | * | 2/1997 | Viertel et al. .............. 264/45.4 |
| 5,603,547 A | * | 2/1997 | Finn et al. ................. 296/97.1 |
| 5,716,092 A | | 2/1998 | Dellinger et al. .......... 296/97.1 |
| 5,779,298 A | | 7/1998 | Smelser et al. ............ 296/97.1 |
| 5,823,603 A | * | 10/1998 | Crotty, III .................. 296/97.1 |
| 5,860,690 A | | 1/1999 | Dellinger et al. .......... 296/97.1 |
| 5,887,933 A | | 3/1999 | Peterson .................... 296/97.1 |
| 5,890,792 A | * | 4/1999 | Finn et al. ................. 296/97.5 |
| 5,975,616 A | * | 11/1999 | Eple et al. ................. 296/97.1 |
| 5,984,398 A | | 11/1999 | Crotty, III .................. 296/97.1 |
| 6,010,174 A | * | 1/2000 | Murdock et al. ......... 296/97.11 |
| 6,033,005 A | | 3/2000 | Crotty, III .................. 296/97.1 |
| 6,042,172 A | * | 3/2000 | Murdock .................. 296/97.12 |
| 6,113,253 A | * | 9/2000 | Yoshii et al. ............. 296/97.13 |
| 6,120,086 A | * | 9/2000 | Miller ....................... 296/97.1 |
| 6,131,985 A | | 10/2000 | Twietmeyer et al. ..... 296/97.12 |
| 6,254,168 B1 | * | 7/2001 | Crotty, III .................. 296/97.1 |
| 6,302,467 B1 | | 10/2001 | Crotty, III et al. ......... 296/97.1 |
| 6,367,861 B1 | * | 4/2002 | Crotty et al. .............. 296/97.1 |
| 6,409,245 B1 | * | 6/2002 | Crotty et al. .............. 296/97.1 |
| 2001/0024048 A1 | * | 9/2001 | Hobson et al. ............ 296/97.1 |
| 2002/0113454 A1 | * | 8/2002 | Crotty et al. .............. 296/97.1 |

* cited by examiner

SUN VISOR ASSEMBLY HAVING A ROUNDED EDGE

CROSS REFERENCE TO RELATED APPLICATIONS

This application is a Continuation-in-Part of U.S. patent application Ser. No. 09/761,445, entitled SUN VISOR ASSEMBLY WITH NON-EXPANDING ADHESIVE, filed on Jan. 17, 2001, now abandoned which is continuation-in-part of U.S. patent application Ser. No. 09/515,315, entitled SUN VISOR ASSEMBLY HAVING A ROUNDED EDGE, filed on Feb. 29, 2000, now U.S. Pat. No. 6,302,467.

BACKGROUND OF THE INVENTION

1. Field of the Invention

The present invention relates generally to sun visors for vehicles, and, in particular, to a sun visor having a rounded edge along at least a portion of the periphery thereof.

2. Description of the Related Art

Over the past several decades, automobile designs have become safer in many respects, one of which relates to the interior compartment the driver and passengers occupy. Specifically, the design of dash boards, steering wheels, handles, control knobs and other interior components has become smoother and softer. Generally speaking, hard, protruding surfaces have been replaced with softer, rounded surfaces wherever possible. One interior component which has undergone such improvements is the sun visor.

One sun visor design is disclosed in U.S. Pat. No. 5,580,118 (Crotty, III), owned by the assignee of the present invention and hereby incorporated by reference. The design disclosed in the '118 patent involves an outer cover assembly, which folds unto itself and sandwiches a core member therebetween. The exterior cover assembly is made of a cloth or vinyl upholstery covering, which is adhesively bonded to a semi-rigid foundation, typically formed of kraft paper. The upholstery cover is made larger than the foundation and thereby folds around the edges of the foundation. Thus, when the sun visor is folded in half, the outer edges of the cover assembly are sandwiched together and define the profile of the sun visor. The core member is disposed between the foundation halves and connects to a rod, which in turn connects to the interior headliner of the vehicle.

A disadvantage associated with such known sun visor designs is that, because portions must be cut out of the foundation to accommodate the visor clip support and visor clip pin, the upholstery cover must be stretched and pulled through these cut out portions during manufacture of the sun visor.

Another known sun visor design involves a cardboard butterfly inner support which is covered with a decorative material. The butterfly is folded to form opposing edges, and a foam urethane adhesive is used to both bind the sides of the butterfly together and to secure the decorative material in place. The foam adhesive contacts the edge of the decorative material contained within the folded butterfly and fixes it in place. As the foam adhesive cures, it expands to form a rigid foam member which forms a stiffening member for the visor.

There are several problems associated with the use of foam adhesives in the assembly of sun visors. For instance, foam adhesives expand during the application process, thus causing the foam adhesive to seep outside the edges of the sun visor when the butterfly is folded to form opposing sides. This results in not only a messy application, but also results in the foam adhesive coming into contact with, and possibly staining or discoloring the decorative material, which covers the exterior surface of the sun visor assembly.

The rigidity exhibited by foam adhesives also creates a disadvantage when used in the assembly of sun visors. When force is exerted upon a sun visor assembled with a foam adhesive stiffening member, the foam adhesive stiffening member and/or the surface upon which it is applied are likely to crack and break rather than bend.

A further problem associated with the use of foam adhesives is that they typically require mixing by an impingement mixer. An impingement mixer is extremely costly and requires a great deal of maintenance, therefore resulting in a higher cost of production for sun visors assembled using foam adhesives.

It is desirable to improve upon the above-referenced designs.

SUMMARY OF THE INVENTION

The present invention provides a sun visor having a rounded member that partially defines the outer periphery of the sun visor. The rounded member avoids the undesirable bifurcated shape of the edge formed when two cover halves of a foldable foundation are sandwiched together, as occurs in prior art sun visors. A non-expanding adhesive is applied around the interior periphery of the foundation, intermediate the foundation halves, and bonds the halves together. The non-expanding adhesive provides a sun visor assembly which is flexible enough to bend under the application of pressure, yet rigid enough to perform its desired function. Additionally, the non-expanding adhesive utilized in the present invention is viscous, making it convenient and non-messy to use when assembling the sun visor.

The basic design of a sun visor as disclosed in U.S. Pat. No. 5,580,118 has certain advantages in terms of production costs, functionality and reliability. Moreover, the design disclosed in the '118 patent has gained a solid reputation throughout the automotive industry. However, international authorities have recently promulgated regulations which impose design constraints on sun visors. One particular restriction requires the contactable edges of non-rigid parts to have a radius of not less than 3.2 mm. Such a requirement poses a design problem with the type of sun visor disclosed in the '118 patent, which problem is addressed by the present invention.

In one form thereof, the present invention provides a sun visor assembly comprising a substantially flat foundation folded unto itself thereby forming two foundation halves. The halves have corresponding shapes that define an edge of the sun visor. An upholstery cover covers the foundation and forms an exterior surface of the sun visor. A bead member is attached to the foundation and is positioned proximate the edge, the bead member comprising a rounded member whose surface comprises a substantially semicircular cross section. The surface faces away from the sun visor, whereby the edge comprises a radius.

In another form thereof, the bead member further comprises a stem member extending from the rounded member, the stem member having a substantially flat surface disposed adjacent one of the halves and connected thereto. The stem member comprises a stake extending therefrom, the stake extending through the one half and heat fused thereto, whereby the stake secures the bead member to the foundation.

In another form, the stem member comprises a pair of stem members, a first one of the pair abutting the first half and a second one of the pair abutting the second half More preferably, the first and said second ones of the pair of stem members abut outside surfaces of the foundation halves.

In another form thereof, the present invention provides a sun visor assembly comprising a substantially flat foundation folded unto itself thereby forming two foundation halves. The halves have corresponding shapes that define an edge of the sun visor. An upholstery cover extends over the foundation and forms an exterior surface of the sun visor. A non-expanding adhesive is applied around the interior periphery of the foundation, intermediate the foundation halves. The adhesive bonds the foundation halves together.

In another form thereof, the present invention provides a sun visor assembly comprising a substantially flat foundation that includes a pair of discreet foundation halves. A core member is disposed between the foundation halves and includes a bead member positioned proximate the edge of the core member.

In another form thereof, the present invention provides a sun visor assembly comprising a substantially flat foundation member defining a first side of the sun visor assembly. A core member defines a second side of the sun visor assembly and includes an integral clip assembly for attaching the sun visor assembly to the roof of a vehicle. The second side of the sun visor assembly is opposite the first side of the sun visor assembly and the core member is attached to the foundation member.

In yet another form thereof, the present invention provides a sun visor assembly comprising a substantially flat foundation folded unto itself, thereby forming two foundation halves. The halves have substantially corresponding shapes that define an edge of the sun visor. A core member is disposed between the foundation halves and includes an integral clip assembly for attaching the sun visor assembly to the roof of a vehicle.

An advantage of the present invention is that it provides a sun visor having a rounded periphery which is safer for the occupant of the vehicle.

Another advantage of the present invention is that its design is compatible with prior art sun visor designs and manufacturing processes. Thus, the sun visor provided by the present invention is cost effective to produce.

Another advantage of the present invention is that the use of the non-expanding adhesive allows for the neat and convenient production of the sun visor assembly. Because the adhesive of the present invention is non-expanding and viscous, it does not flow out of the sun visor assembly when the sun visor assembly is clamped together. While the adhesive does elongate and come into contact with the edge of the upholstery which is folded around the periphery of the foundation, it does not increase in volume in the manner that foam adhesives do.

Another advantage offered by the use of the non-expanding adhesive is that the adhesive is very tolerant of temperature fluctuations, allowing the visor assembly process to be carried out over a wide range of temperature and humidity conditions. Additionally, the inventors have found that the non-expanding adhesive sticks better to kraft paper and to upholstery than does the foaming adhesive.

Still another advantage of the present invention is that the use of the non-expanding adhesive allows for a sun visor assembly having a relatively high degree of flexibility, thus allowing the sun visor assembly to bend rather than break upon the application of pressure. The non-expanding adhesive exhibits a modulus stretch of at least 30%, making it an ideal adhesive for application to a sun visor assembly.

Yet another advantage of the present invention is that the use of non-expanding adhesive does not require the use of expensive mixing equipment, as does the foam adhesive used previously.

A further advantage of the non-expanding adhesive of the present invention is that it is non-wicking, meaning that should it come into contact with one side of the upholstery, it will not stain or discolor the reverse side of the upholstery.

An advantage of a core member that defines an integral visor clip and visor support pin is the simplification of the manufacturing process of the sun visor assembly. Specifically, with such a construction, there is no need to cut an opening in the foundation for the visor clip or the visor support pin, and therefore no need to stretch and pull the edge portion of the upholstery cover through the cut out portions therein.

BRIEF DESCRIPTION OF THE DRAWINGS

The advantages and objects of this invention and the manner of attaining them, will become more apparent and the invention itself will be better understood by reference to the following description of embodiments of the invention taken in conjunction with the accompanying drawings, wherein:

FIG. 25 is an exploded perspective view of a sun visor having a core defining an integral visor clip support and visor clip pin;

FIG. 26 is a cross sectional view taken along lines 26—26 of FIG. 25;

FIG. 27 is a cross sectional view taken along lines 27—27 of FIG. 25;

Figure 1:
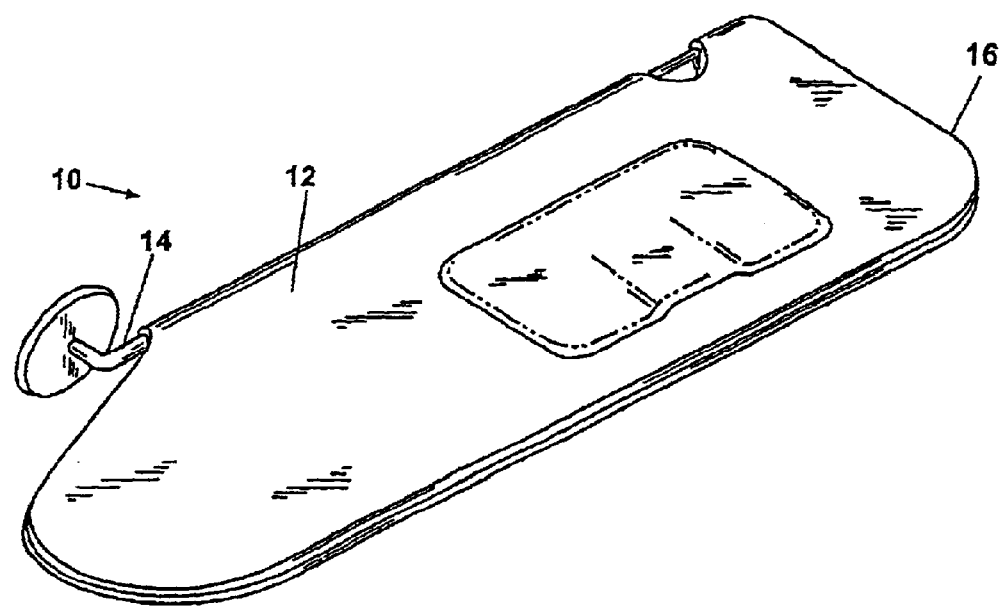
FIG. 1 is a perspective view of a prior art sun visor.

Corresponding reference characters indicate corresponding parts throughout the several views. Although the drawings represent embodiments of the invention, the drawings are not necessarily to scale and certain features may be exaggerated or omitted in order to better illustrate and explain the present invention

DETAILED DESCRIPTION

Referring to FIG. 1, prior art sun visor 10 includes outer shell assembly 12. The shell is typically formed of a rigid or semi-rigid foundation (not shown) having an upholstery material adhesively bonded thereto. The cover assembly folds unto itself and a core member which attaches to rod 14 is disposed therebetween. Edge 16, which partially defines the periphery of the sun visor, is somewhat undesirable because it is not round. Instead, edge 16 is formed of two corresponding edges of outer assembly 12 which are sewn or adhesively bonded together. A design similar to that shown in FIG. 1 is disclosed and described in U.S. Pat. No. 5,580,118, which is hereby incorporated by reference.

Figure 2:
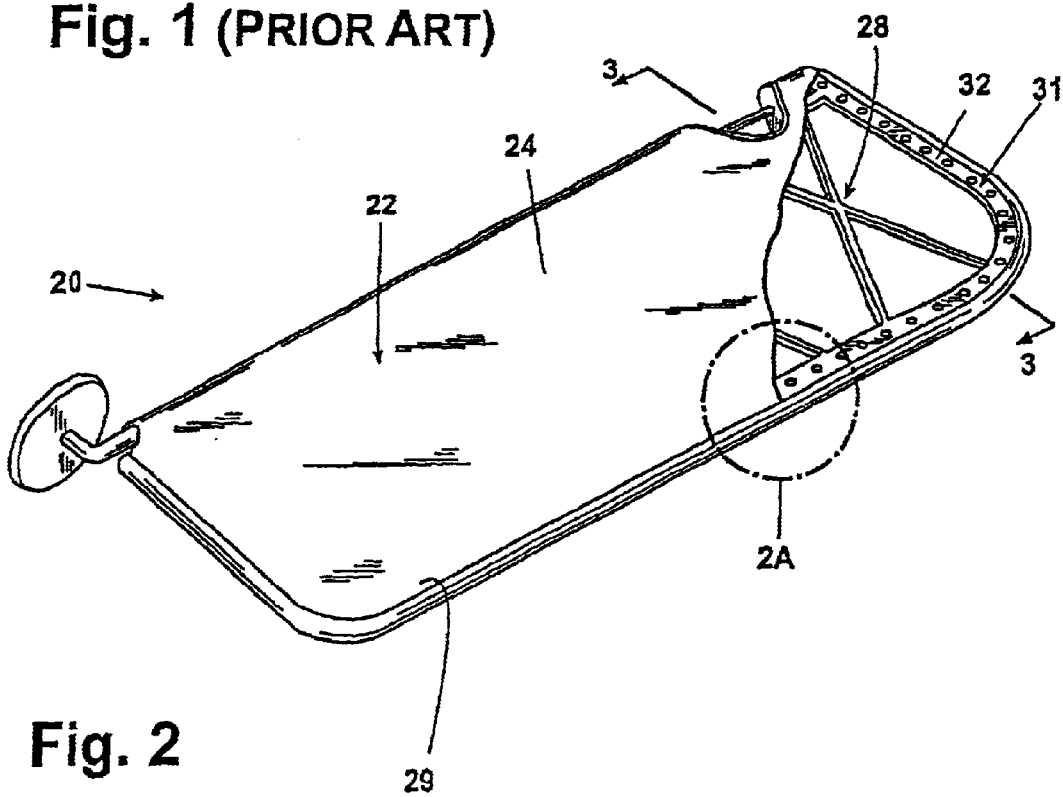
FIG. 2 is a perspective view partially broken away of a sun visor in accordance with the present invention.

FIG. 2 depicts an embodiment in accordance with the present invention. Sun visor assembly 20 includes an outer shell assembly 22 which is made up of upholstery cover 24 overlaying and adhesively bonded to foundation 26 as can be better seen in FIGS. 2a and 3. Foundation 26 is substantially flat and is folded unto itself thereby forming two foundation halves 30. Halves 30 have corresponding shapes that define the edge 29 of sun visor assembly 20.

Figure 3:
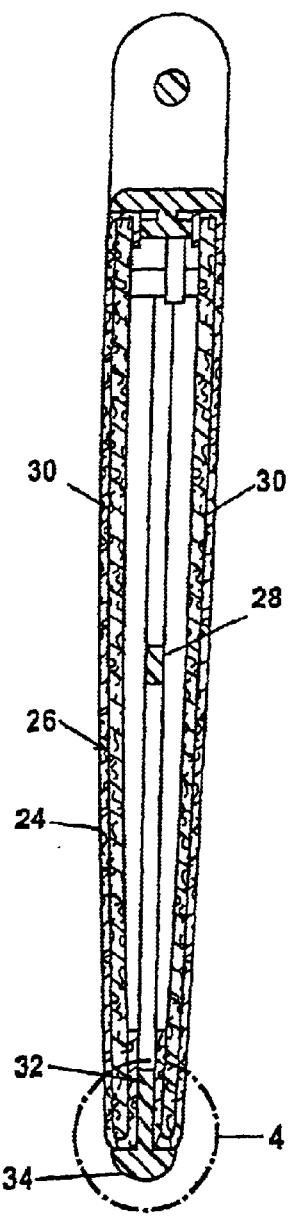
FIG. 3 is a cross sectional view taken along lines 3—3 of FIG. 2.
Figure 2A:
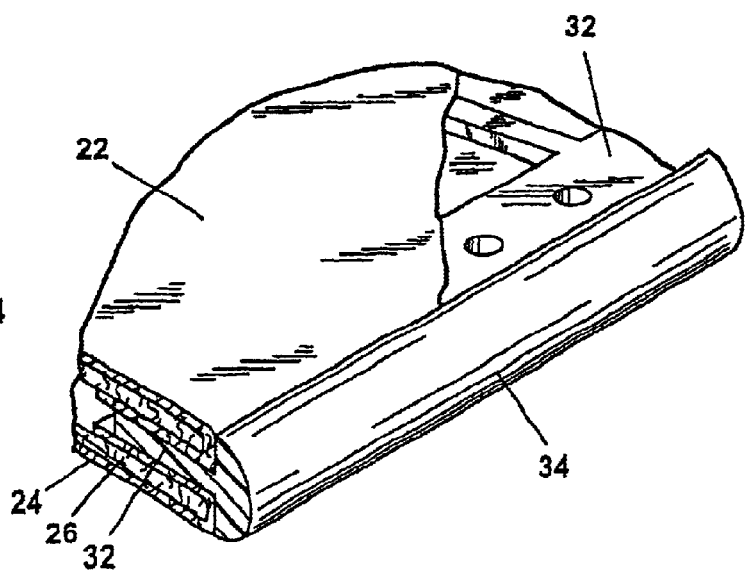
FIG. 2a is an enlarged fragmentary perspective view of the portion indicated in FIG. 2.

Upholstery cover 24 is larger than foundation 26 so that upholstery 24 can be folded around the edges of foundation 26, whereby foundation 26 is totally covered by upholstery 24. Cover assembly 22 can be folded unto itself into two halves 30. Core member 28 is disposed between two halves 30, and is substantially covered by cover assembly 22. Core member 28 further includes a bead member 31 integrally formed at the periphery of core member 28. Bead member 31 includes a stem member 32, which is shown in FIG. 2 as a substantially flat rectangular portion of core member 28 formed about the outer periphery thereof. As shown in FIGS. 2a and 3, core member 28 is sandwiched between halves 30 of outer shell 22.

Figure 4:
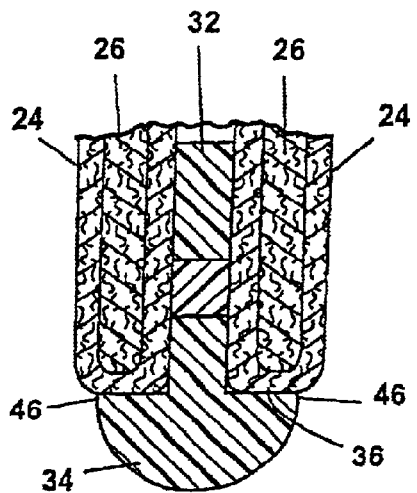
FIG. 4 is an enlarged fragmentary sectional view of the portion of the sun visor indicated in FIG. 3.

Advantageously, bead member 31 includes rounded member 34 integrally formed therewith. As shown in FIGS. 2A and 3, stem member 32 terminates substantially in the middle of flat portion 36 of rounded member 34. Corresponding edges 46 (FIG. 4) of cover assembly 22 are positioned adjacent flat portion 36. More particularly, flat portion 36 abuts upholstery material 24 of cover assembly 22 whereas the surface of rounded member 34 faces away from sun visor assembly 20. As shown in FIG. 2, rounded member 34 partially defines the outer edge of sun visor assembly 20, thereby forming a smooth periphery. By contrast, in a prior art sunvisor such as that shown in FIG. 1, the edges of the cover assembly are joined together to form a somewhat flat, bifurcated edge 16 as shown in FIG. 1. Advantageously, externally disposed rounded member 34 eliminates prior art edge 16. It can thus be appreciated that rounded member 34 forms a smoother peripheral surface than the prior art sun visor shown in FIG. 1.

The manner of making sun visor assembly 20 is known in the art and therefore need not be described in detail herein. For example, U.S. Pat. No. 5,580,118, owned by the assignee of the present application and hereby incorporated by reference, discloses a sun visor having a foldable outer cover assembly and a core member covered by the cover assembly.

Figure 5:
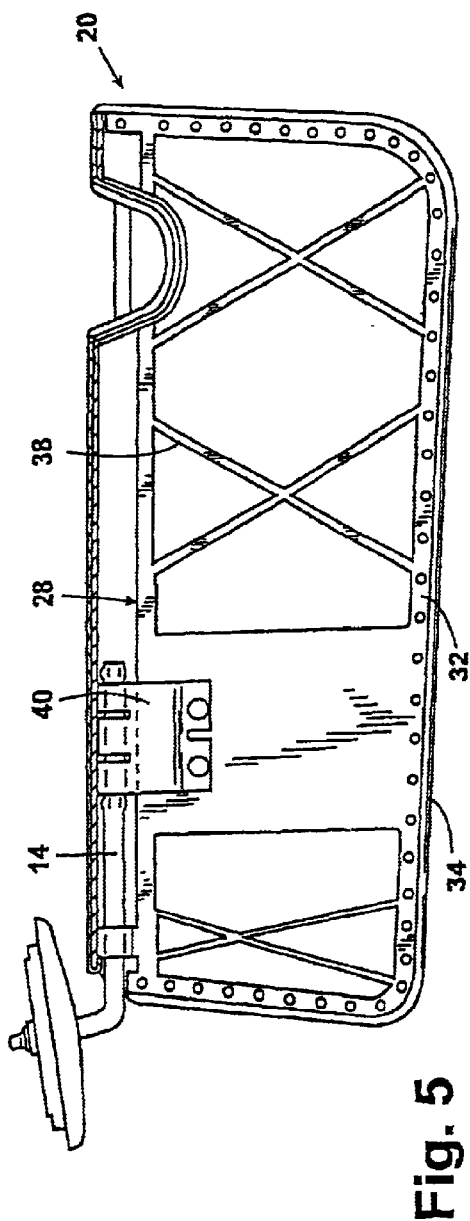
FIG. 5 is a plan view of the core member of one disclosed embodiment.

Rounded member 34 can be used with various sun visor/core member configurations. For example, FIG. 5 illustrates core member 28 having reinforcing ribs 38, stem member 32 and rounded member 34. Hinge block 40 is attached to core member 28 and receives rod 14 which is adapted to attach to a vehicle headliner (not shown). In the embodiment shown in FIG. 5, hinge block 40 can rotate about rod 14 but cannot slide relative thereto. A hinge block 40 like that shown in FIG. 5 is disclosed in U.S. Pat. No. 6,131,985, which is owned by the assignee of the present invention and is hereby incorporated by reference.

Figure 6:
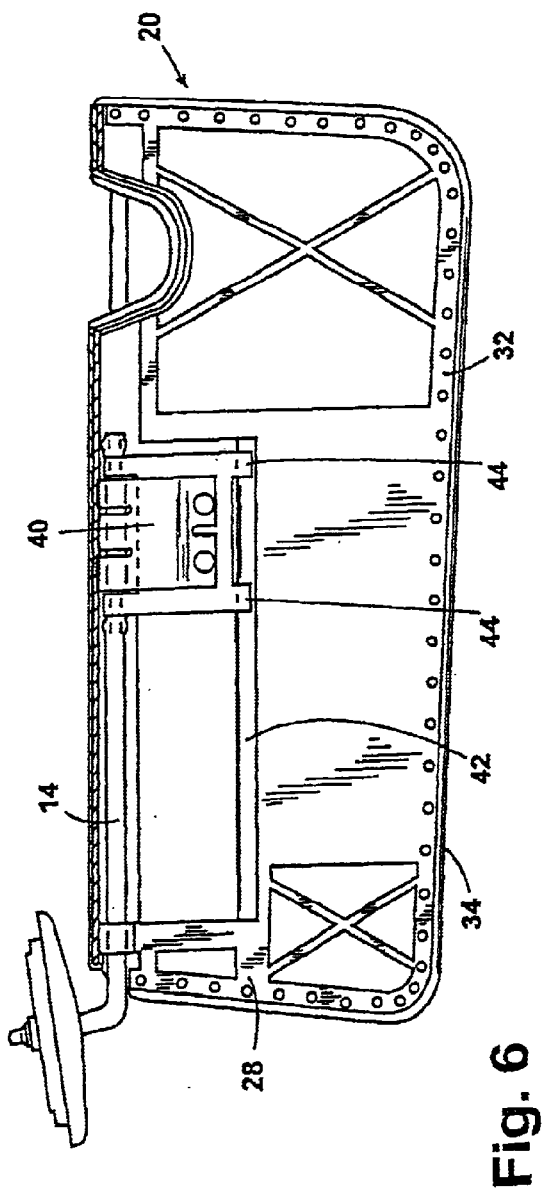
FIG. 6 is a plan view of a core member of a second disclosed embodiment.

FIG. 6 illustrates an alternate embodiment of hinge block 40 also similar to that disclosed in U.S. Pat. No. 6,131,985. Core member 28 includes cylindrical rail 42 which slides within projecting arms 44 of hinge block 40. Thus, core member 28 can slide relative to hinge block 40 and rod 14, as shown in FIG. 6.

Outer assembly 22 can be made from any number of upholstery and foundation materials. For example, U.S. Pat. No. 6,033,005, which is owned by the assignee of the present invention and is hereby incorporated by reference, discloses a foundation material of expanded polypropylene (EPP) to which the cover material is bonded. Core member 28, such as that shown in either FIGS. 5 or 6, including rounded member 34 would perform suitably well with the EPP foundation disclosed in U.S. Pat. No. 6,033,005.

Figure 7:
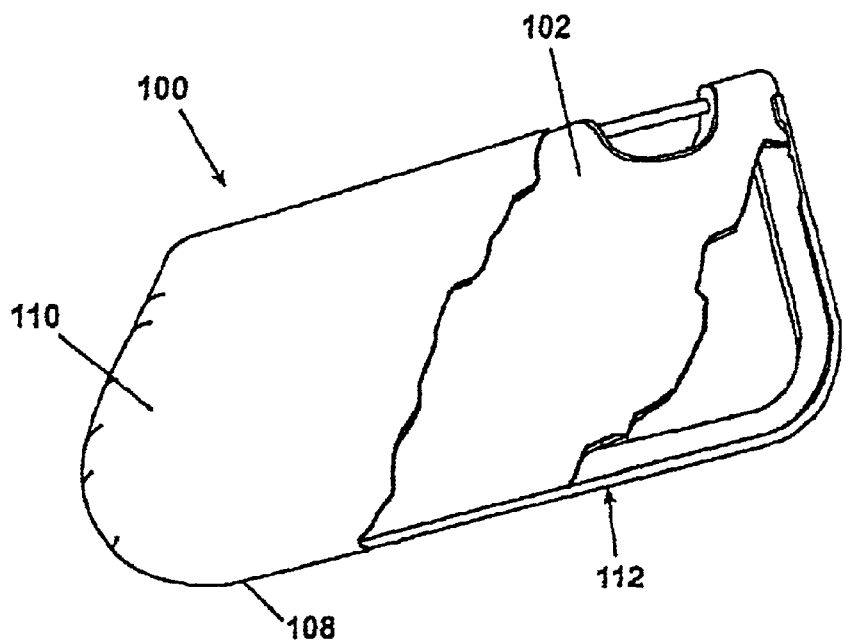
FIG. 7 is a perspective view of a second embodiment incorporating the present invention shown with parts of the cover assembly broken away.
Figure 8:
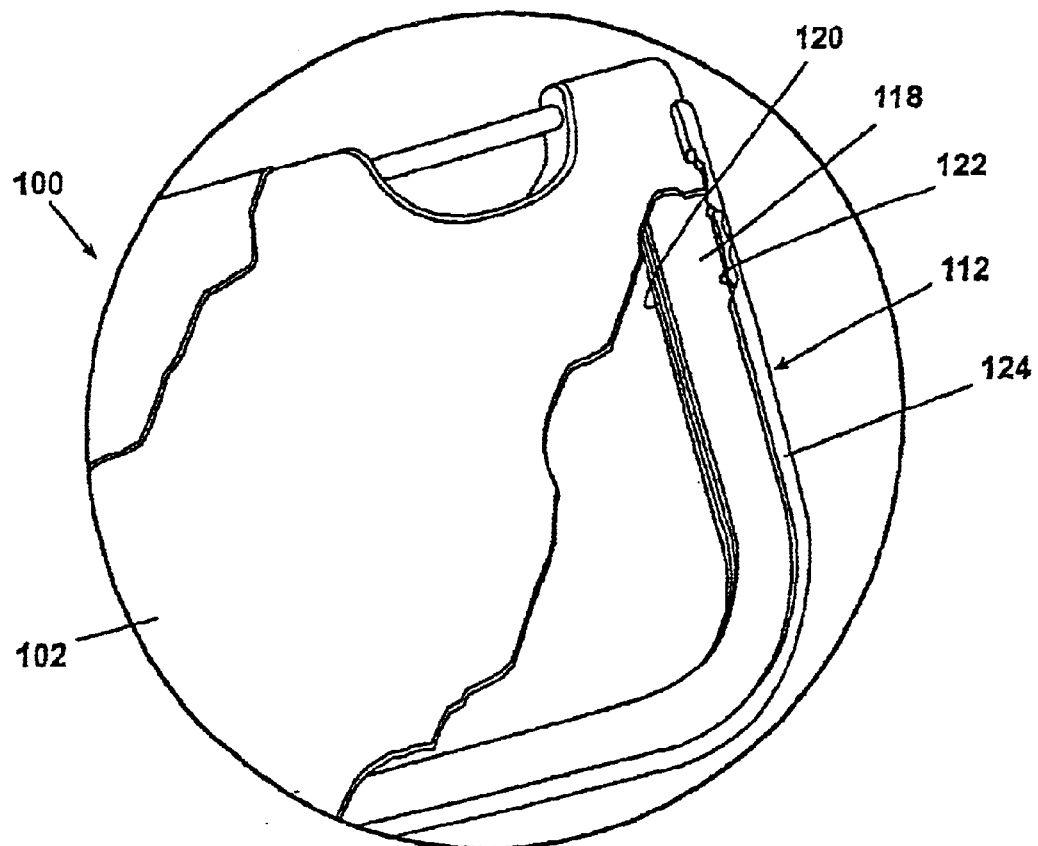
FIG. 8 is an enlarged fragmentary perspective view of the sun visor of FIG. 7.
Figure 9:
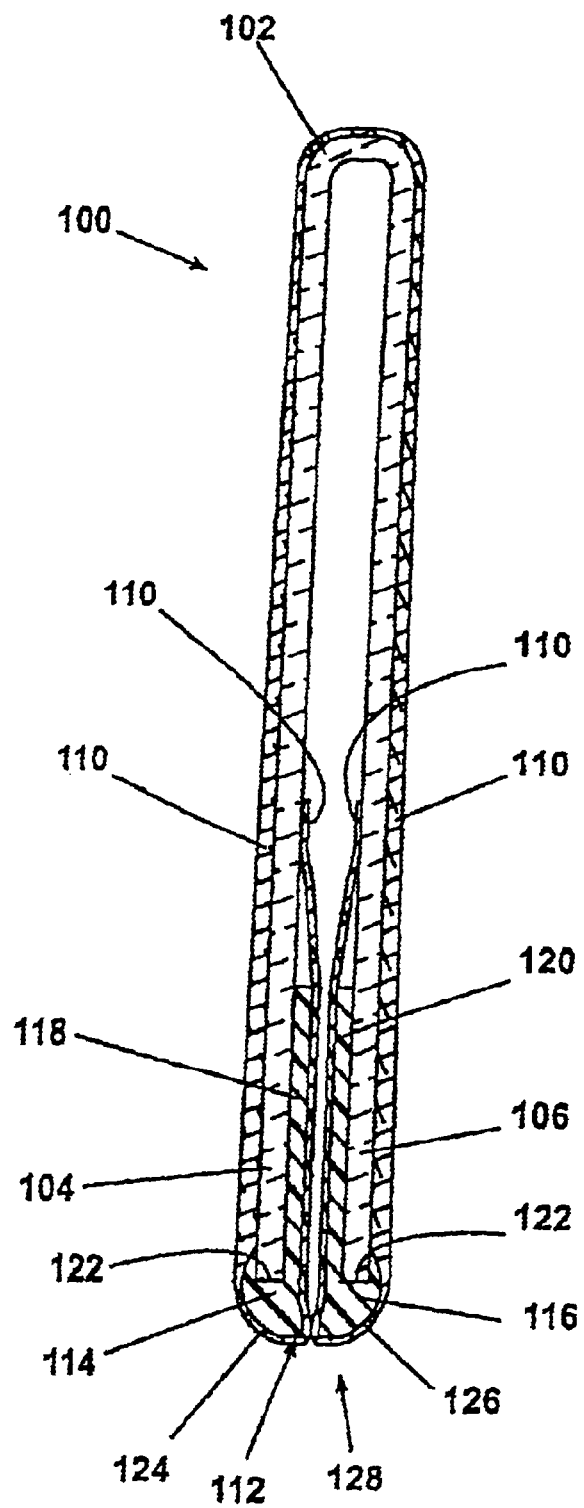
FIG. 9 is a sectional view of the sun visor of FIGS. 7 and 8.

Turning now to FIGS. 7–9, sun visor assembly 100 represents a second embodiment incorporating the present invention. Visor assembly 100 includes a substantially flat foundation 102 folded unto itself thereby forming two foundation halves 104 and 106 (FIG. 9). Halves 104 and 106 have corresponding shapes that define edge 108 of said visor assembly 100. Foundation layer 102 is typically formed of kraft paper, as is well-known in the art. An upholstery cover 110 covers foundation layer 102 and forms an exterior surface of visor assembly 100.

A bead member 112 is attached to foundation 102 and is positioned proximate edge 108. Referring to FIG. 9, it can be appreciated that bead member 112 is actually formed of two substantially identical integrally formed bead member sections 114 and 116. Section 114 includes a stem 118 abutting foundation half 104 and section 116 includes a stem 120 abutting half 106. With further reference to FIG. 9, each of the sections 114 and 116 includes a square groove 122 which receives an edge of foundation 102 by means of a friction fit, which secures bead member sections 114 and 116 to the foundation.

As can be further appreciated from FIG. 9, bead member sections 114 and 116 are formed with substantially symmetrical bulbous portions 124 and 126, respectively. Bulbous portions 124 and 126 are aligned with and pressed against one another and together define a rounded member 128. That is, instead of a unitary rounded member 34 as described with reference to FIGS. 1–6, rounded member 128 is formed from the two separate bulbous portions 124 and 126. Cover 110 envelops bulbous portions 124 and 126 and bulbous portions 124 and 126 sandwich cover 110 therebetween. As can be appreciated with reference to FIG. 9, the surface of rounded member 128 is of substantially semicircular cross section which faces away from the sun visor, such that the edge of the sun visor forms a radius. It is to be understood, for purposes of this specification, that the term "semicircular" is to be construed broadly to include a surface substantially resembling an arc. For example, rounded member 128 is formed from two discrete bulbous portions 114 and 116, and cover 110 is disposed between bulbous portions 114 and 116. Yet bulbous portions 114 and 116 combine to form a surface having a semicircular cross section as that term is defined in this specification.

Adhesive applied around the inside periphery of the cover or other means known in the art can be employed to adhere the cover to the remainder of the visor assembly. It is also contemplated that the cover may be sonic or vibratory welded to the visor assembly. The same or additional adhesive can be employed to adhere the two halves of the "clam-shell" visor together, thereby maintaining the sun visor in the assembled configuration shown in FIG. 9.

In the design shown in FIG. 9, the assembly is performed as is conventionally known, except that it includes the additional step of securing the bead member sections 114 and 116 to foundation halves 104 and 106, respectively, before cover 110 is attached to foundation 102.

Turning now to FIGS. 10–14, sun visor assembly 200 represents a third embodiment incorporating the present invention. Visor assembly 200 includes a substantially flat foundation 202 folded unto itself thereby forming two foundation halves 204 and 206 (shown unfolded in FIGS. 10 and 11). Halves 204 and 206 have corresponding shapes that, when folded together, define edge 208 (FIG. 14) of visor assembly 200. Foundation layer 202 is typically formed of kraft paper, as is well-known in the art. However, the foundation material may also consist of "Superwood®," (a registered trademark of Georgia-Pacific Corporation) which is a type of hardboard available from Georgia-Pacific Corporation of Duluth, Minn. and Superior, Wis. Alternative foundation materials such as other types of hardboard, kraft paper, and plastic may also be used.

An upholstery cover 210 covers foundation layer 202 and forms an exterior surface of visor assembly 200. Cutouts 211 and 213 are formed in foundation 202 to accommodate a vanity mirror and a clip assembly, respectively, as is known in the art.

Figure 10:
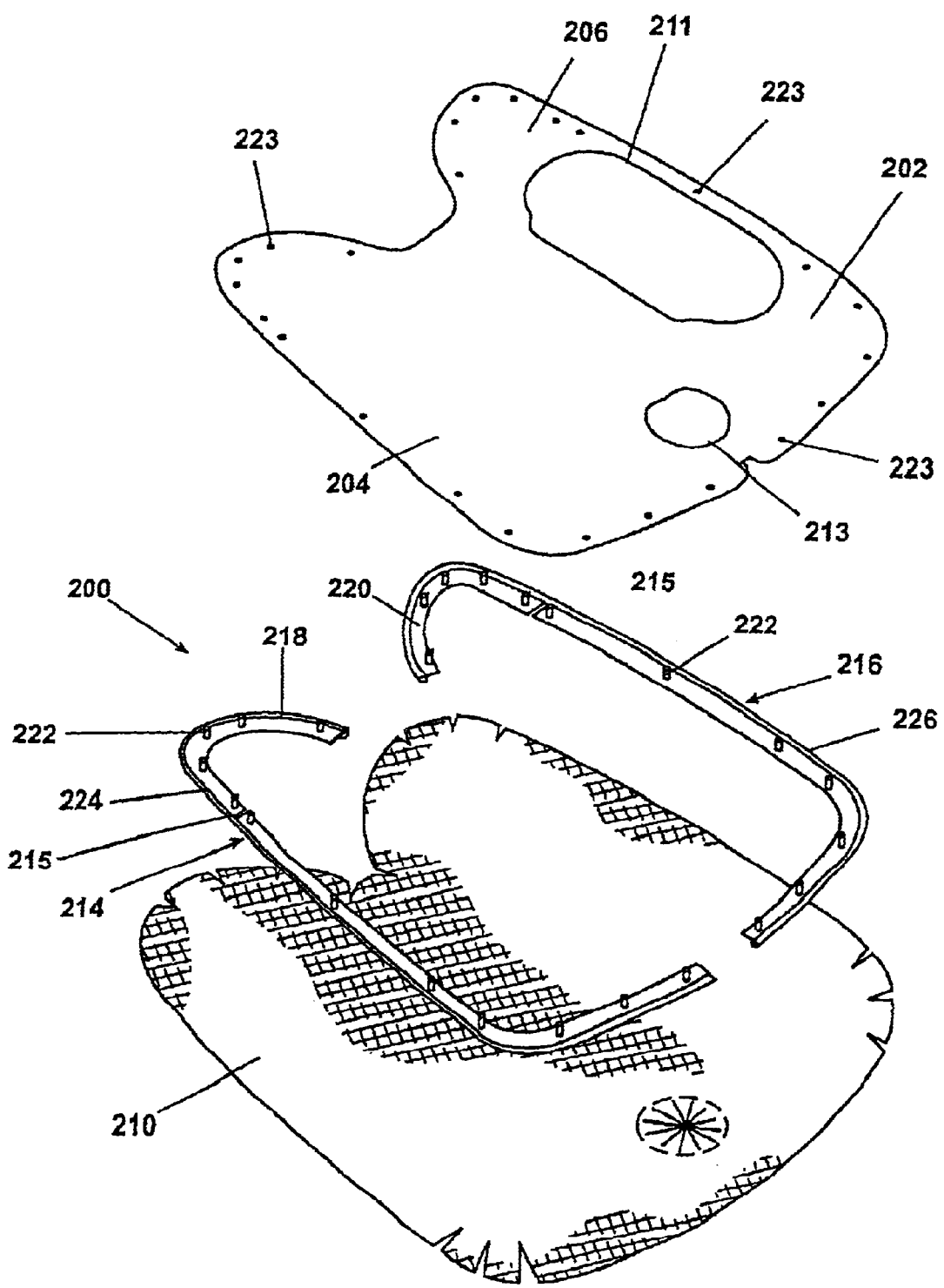
FIG. 10 is an exploded perspective view of a third embodiment incorporating the present invention.
Figure 11:
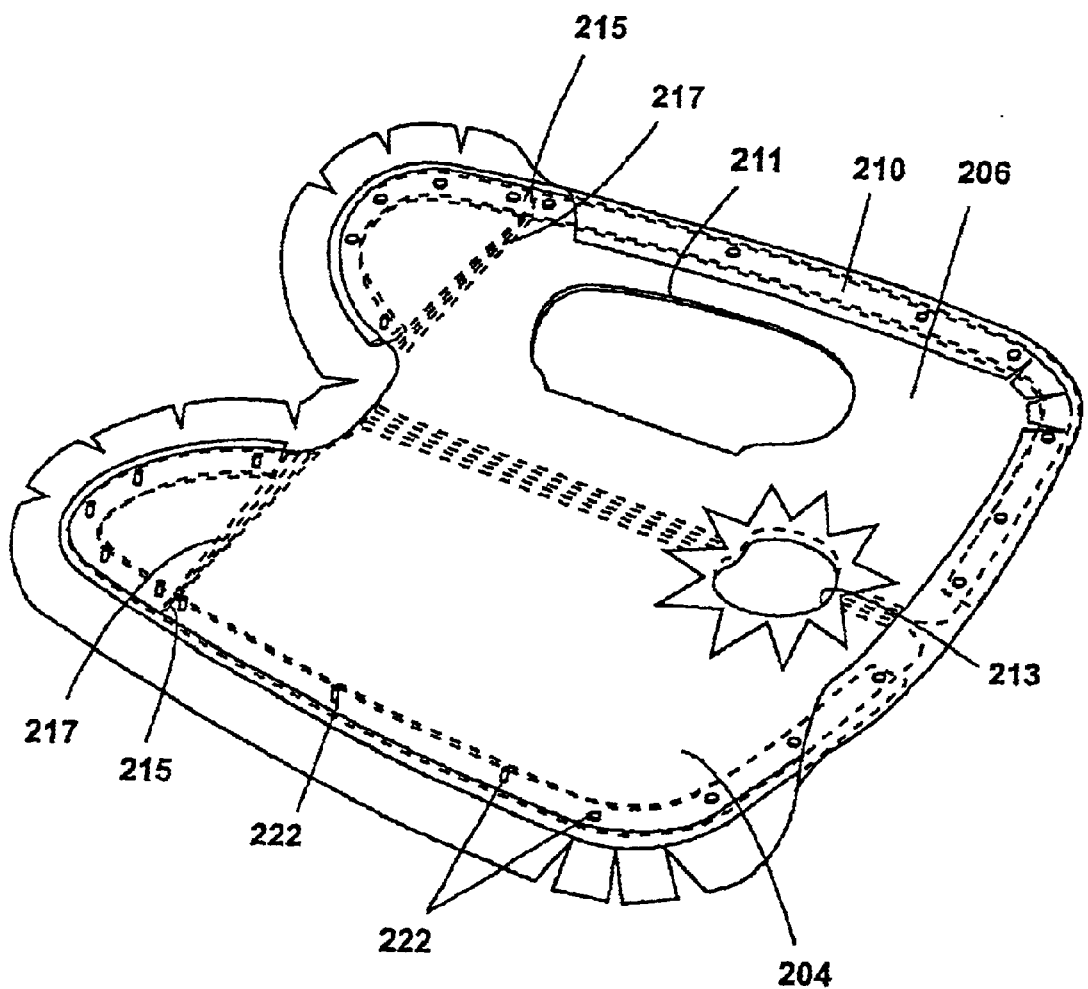
FIG. 11 is a perspective view of the visor of FIG. 10, shown with only part of the cover folded over the edge of the foundation layer to illustrate the heat stake technology, and is shown with only some of the stakes being "fused" to the foundation.
Figure 12A:
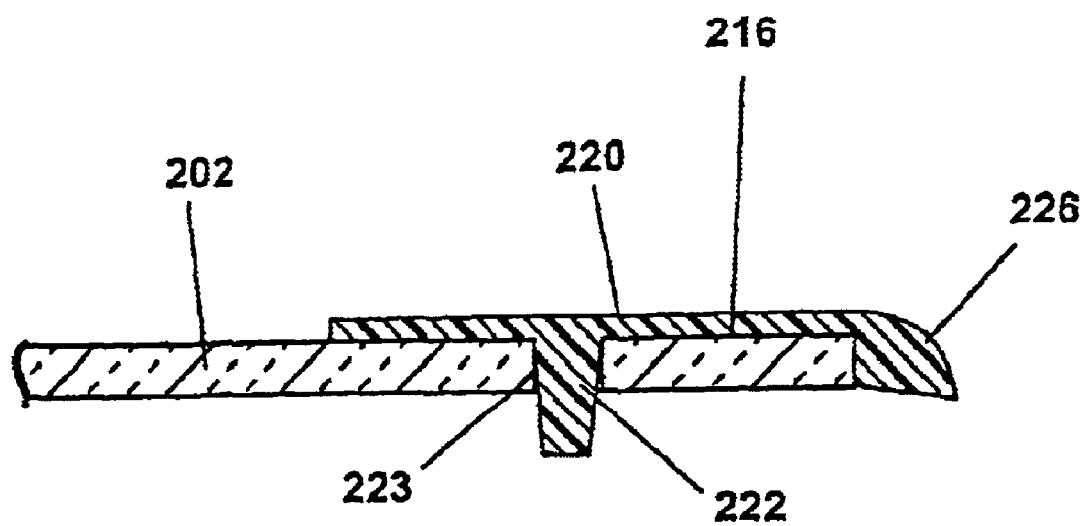
FIGS. 12a and 12b are fragmentary sectional views illustrating a heat stake embodied by the present invention, before and after fusion, respectively.
Figure 12B:
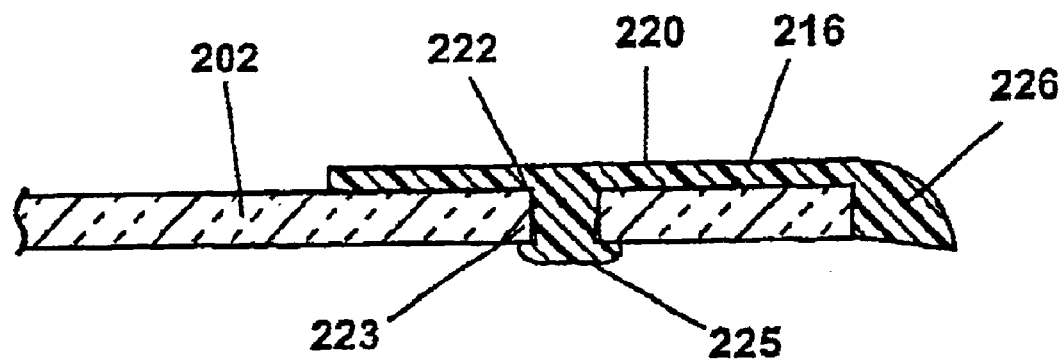
Figure 13:
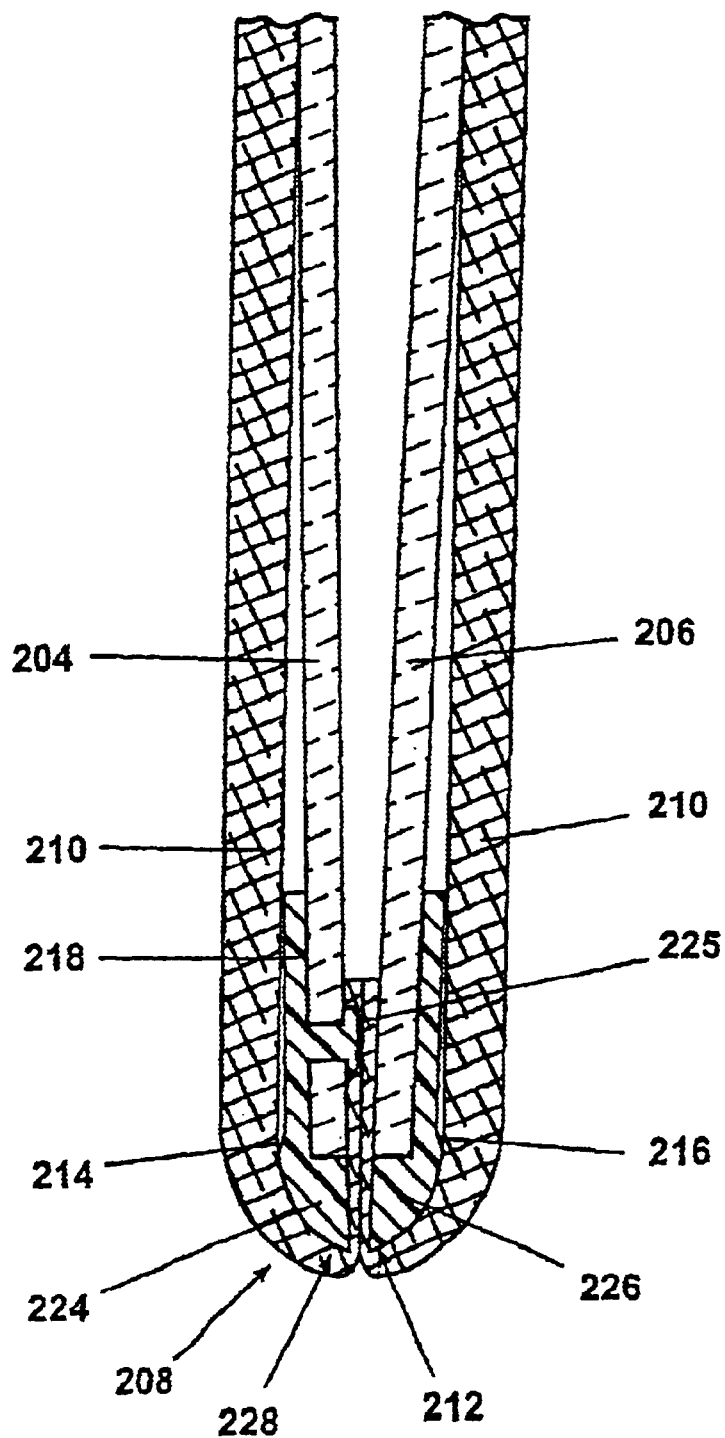
FIG. 13 is a sectional view of the visor shown in FIGS. 11 and 12.
Figure 14:
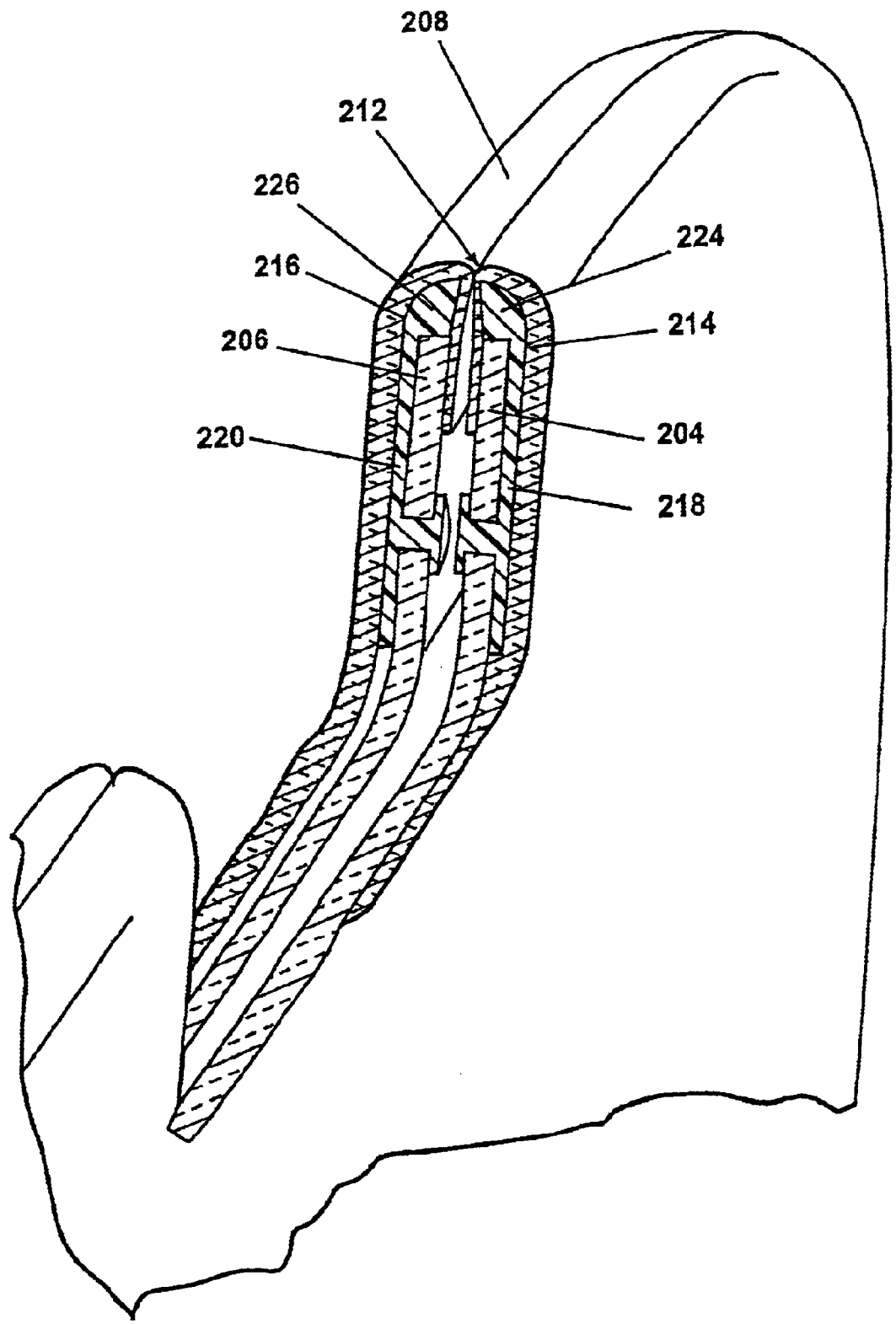
FIG. 14 is a perspective view of the visor shown in FIGS. 11 and 12 and is shown partly in section to illustrate the bead member sections embodying the present invention.

Again referring to the embodiment shown in FIGS. 10–14, it can be appreciated that two substantially identical integrally formed bead member sections 214 and 216 are pressed together to form a bead member 212 (FIGS. 13 and 14) that partially defines the edge 208 of sun visor 200. With further reference to FIGS. 13 and 14, section 214 includes a stem 218 abutting the outside of foundation half 204 and section 216 includes a stem 220 abutting half 206. By contrast, stems 118 and 120 of the second embodiment, described hereinabove with reference to FIGS. 7–9, abut the inside of foundation halves 104 and 106, respectively. As shown in FIGS. 10 and 11, both of bead member sections 214 and 216 include a cutout 215 so that the rounded flap portion of the visor can be bent along crease lines 217 (FIG. 11).

With further reference to FIGS. 10–14, and particularly FIGS. 12a and 12b, stems 218 and 220 of bead member sections 214 and 216, respectively, include a plurality of stakes 222 extending therefrom. Stakes 220 fit through corresponding apertures 223 (FIG. 10) formed in foundation layer 202. FIG. 12a illustrates a stake 222 prior to fusion whereas FIG. 12b illustrates a stake 222 after heat has been applied thereto. FIG. 11 depicts some of the stakes being heat fused and others prior to heat fusion. As the plastic material, which is preferably polypropylene or ABS plastic, melts during heat staking, it flows downward by the force of gravity toward the foundation 202 and forms a cap 225 that locks stem 220 against foundation 202 and thereby secures the bead member sections 214 and 216 to foundation 202. As can be appreciated with reference to FIG. 14, stakes 222 on opposite stems point toward one another, toward the middle of the sun visor assembly.

The production process of sun visor 200 is substantially the same as is known in the art, except that it includes the additional step of securing bead member sections 214 and 216 to foundation 202 using heat stake technology before securing cover 210 to the foundation.

As can be further appreciated from FIGS. 13 and 14, bead member sections 214 and 216 are formed with substantially symmetrical bulbous portions 224 and 226, respectively. Bulbous portions 224 and 226 are aligned with one another and together define a rounded member 228. Cover 210 envelops bulbous portions 224 and 226 and bulbous portions 224 and 226 sandwich cover 210 therebetween. As can be appreciated with reference to FIGS. 13 and 14, the surface of rounded member 228 is of substantially semicircular cross section and faces away from the sun visor, such that the edge of the sun visor forms a radius. It is preferable that the radius formed by the cross sectional surface of rounded member 228 be at least 3.2 mm, more preferably at least 3.5 mm.

Adhesive applied around the inside periphery of the cover or other means known in the art can be employed to adhere the two halves of the "clam-shell" visor together, thereby maintaining the sun visor in the assembled configuration shown in FIGS. 13 and 14.

Turning now to FIGS. 15–18, sun visor assembly 300 includes a substantially flat foundation 302 preferably formed from kraft paper and which is folded unto itself, thereby forming foundation halves 304 and 306. As in the embodiments disclosed above, sun visor 300 includes an upholstery cover 308 which covers foundation 302 and forms an exterior surface of sun visor 300.

Figures 15, 15A:
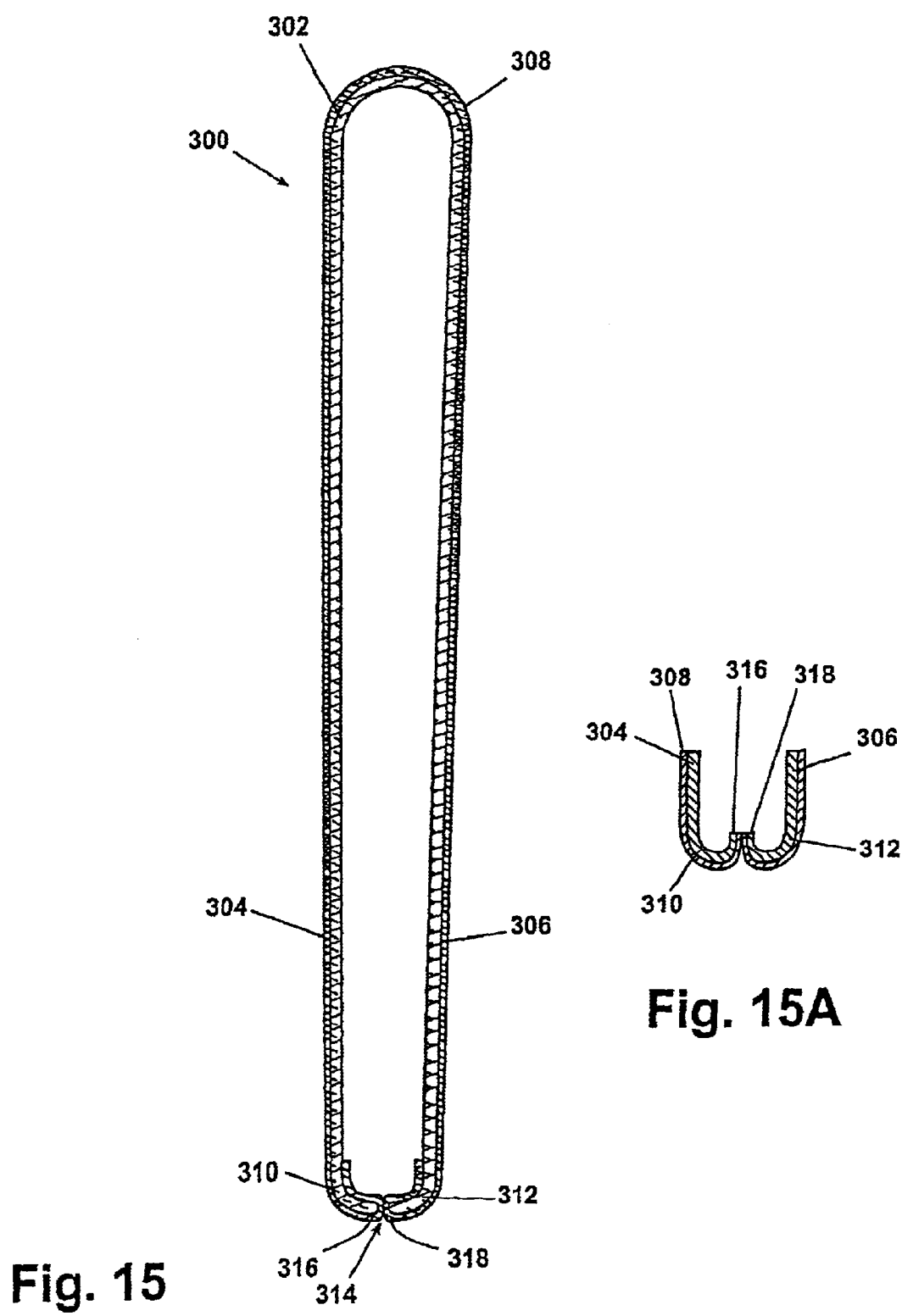
FIG. 15 is a sectional view of a fourth embodiment of the present invention, wherein the foundation layer includes an integrally formed radius edge.
FIG. 15a is a fragmentary sectional view illustrating an alternate mating engagement between the peripheral portions which define the rounded edge of the sun visor.
Figure 16:
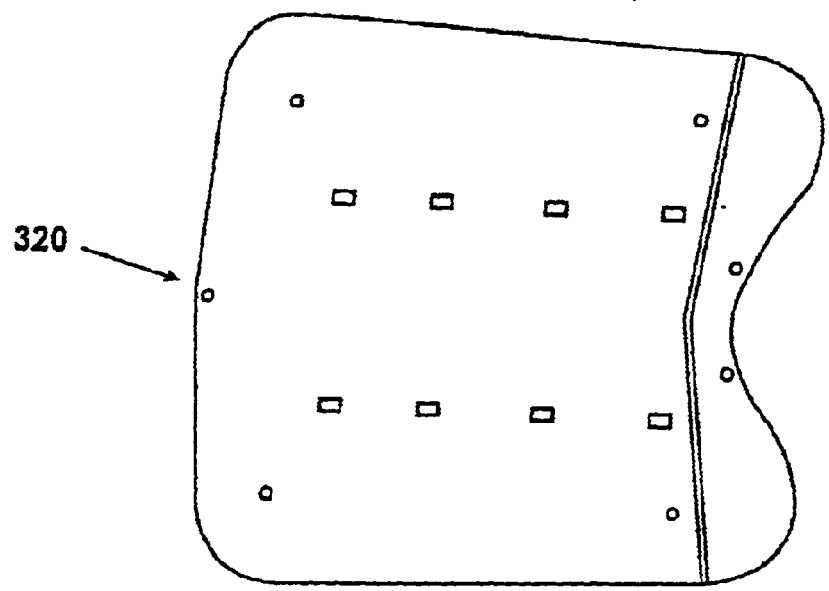
FIG. 16 is a plan view of a bottom die used to form the radius edge on the foundation of the sun visor assembly shown in FIG. 15.

As shown in FIG. 15, half 304 and half 306 each include an integrally formed rounded periphery portion, shown as periphery portions 310 and 312, respectively. Portions 310 and 312 "mate" with one another to form a rounded member, or edge 314, whose cross-section is semicircular, as that term is defined hereinabove. The term "mate," as used herein, is to be construed broadly to include variations in the way in which periphery portions 310 and 312 may align with one another in an assembled sun visor.

For example, in the embodiment illustrated in FIG. 15, peripheral portions 310 and 312 have ends 316 and 318, respectively, which face and abut one another and sandwich cover 308 therebetween. However, the peripheral portions may "curl up" to a greater extent than shown in FIG. 15, resulting in a configuration like that shown in FIG. 15a. Alternatively, the peripheral portions may overlap (not shown). One skilled in the art would readily recognize other variations in the way in which the separate peripheral portions of visor 300 matingly engage one another, all of which are within the scope of this disclosure.

Visor 300 can be assembled by first die-cutting foundation 302 to the general shape of the sun visor as is known in the art, except that the foundation is formed a bit larger than is conventional to allow for the rounded peripheral portions. As a second step, the foundation is placed between upper and lower dies, like lower die 320 shown in FIG. 16 and upper die 322 shown in FIG. 17.

Figure 17:
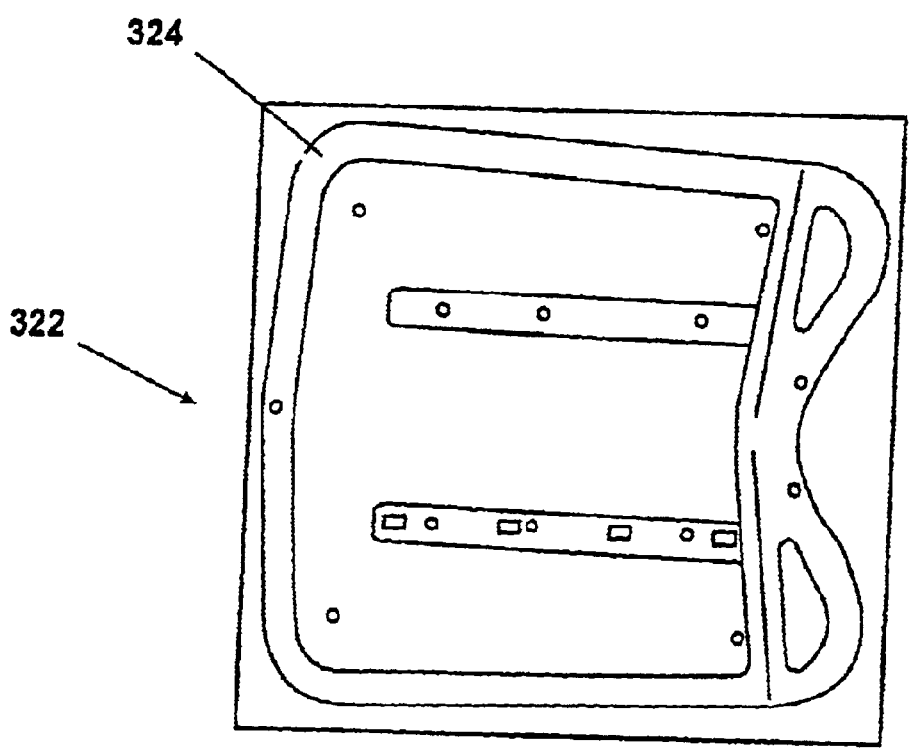
FIG. 17 is a plan view of a top die used to form the radius edge on the foundation of the sun visor assembly shown in FIG. 15.
Figure 18:
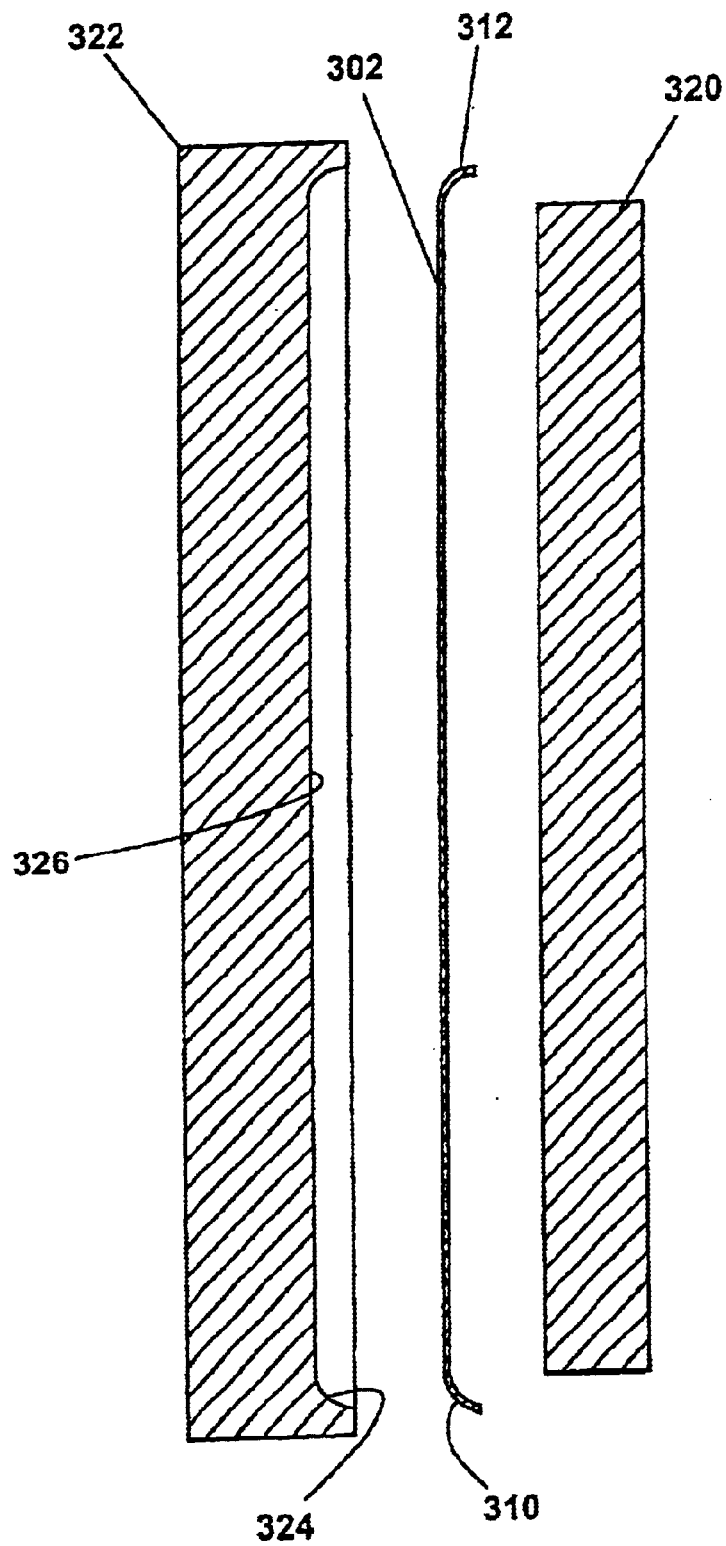
FIG. 18 is a cross sectional view exploded away which depicts the formation of the radius in the foundation of the sun visor assembly using the dies shown in FIGS. 16 and 17.

While lower die 320 (FIG. 16) is substantially flat, upper die 322 includes a radius portion 324 disposed about its outer periphery as shown in FIGS. 17 and 18, which radius forms the rounded periphery of the foundation layer when the dies are pressed together. As shown in FIG. 18, die 322 includes a recess 326 in its center so that lower die 320 (which is smaller than upper die 322) is received within recess 326 of upper die 322, thereby sandwiching foundation 302 therebetween, forming peripheral portions 310 and 312 of foundation 302. One of ordinary skill in the art would readily recognize other methods and variations of the method described herein for forming the rounded peripheral edge on foundation 302.

After the rounded peripheral portion is formed, upholstery cover 308 is folded around the entire periphery of foundation 302 and glued to foundation 302 using a primary "hot melt" glue, such as "M2178W Polyester Hot Glue" available from the Findlay company. Next, the necessary holes for the vanity mirror, retention clip, etc. are punched. The upholstery cover is "after cut" to conform to the holes and glued to the foundation as is known in the art. Next, the accessories, such as the vanity mirror and retention clip, are snapped into the respective holes formed therefor. The interior components of the sun visor, such as the rail and core member are then placed between the two halves, and the foundation is sealed together. This final seal is accomplished by applying a secondary non-expanding adhesive around the interior edge of the foundation and holding the two halves together until the glue has cured.

One such secondary non-expanding adhesive suitable for practicing the present invention is a two-component adhesive comprised of a 1:1 ratio of "Plio Grip® 7400 Urethane Resin" and "Plio Grip® 7401 Catalyst" (C 6182-146), a two part iso-cyanate polyol urethane adhesive available from Ashland Chemical Corporation, Columbus, Ohio. ("Plio Grip®" is a registered trademark of Ashland Chemical Corporation.) It will be appreciated that various ratios may be utilized in response to composition changes in the non-expanding adhesive.

Alternatively, another suitable non-expanding adhesive is "Evans 07505," a pressure sensitive adhesive (PSA), available from Evans Adhesive Corporation, Columbus, Ohio. Advantageously, pressure sensitive adhesives do not require that the foundation halves be clamped together within a particular period of time. Rather, pressure sensitive adhesives retain their adhesive characteristics until it is desirable to adhere the foundation halves together.

Figure 20:
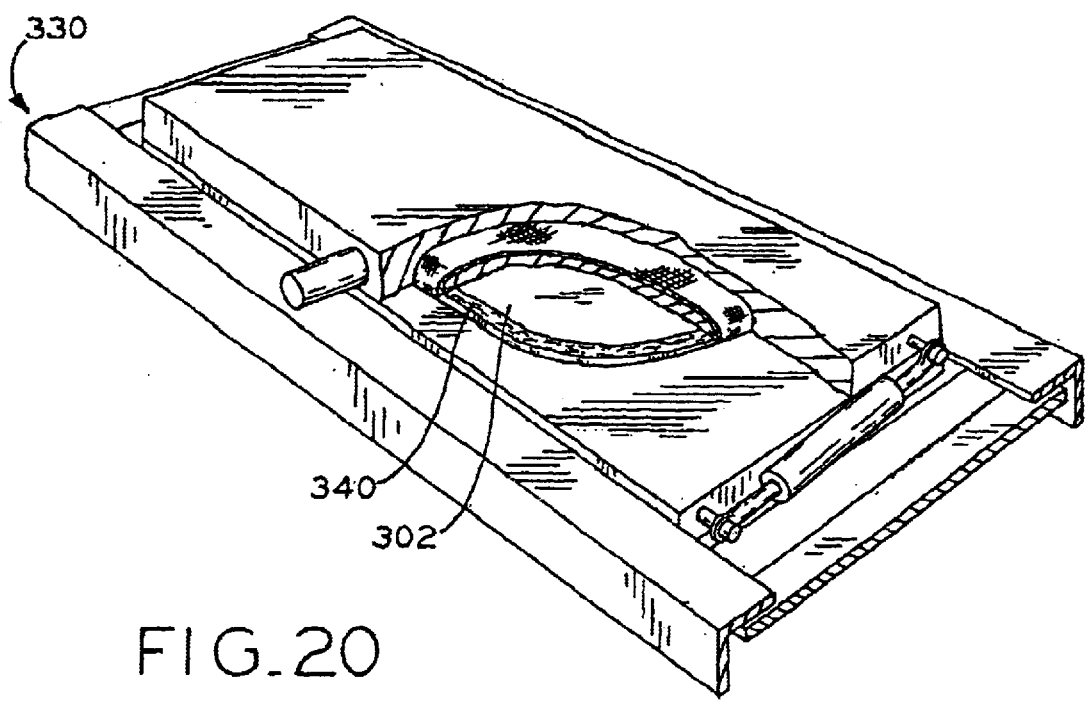
FIG. 20 is a perspective view of a sun visor assembly with a portion of the jig and one side of the visor assembly broken away to illustrate the adhesive coming into contact with both the foundation and the upholstery.

The resin and catalyst components of the iso-cyanate polyol urethane adhesive are static mixed and applied via robotic arm 332 to the portion of the periphery of foundation 302 which is adjacent to the folded end of foundation 302. The secondary adhesive 334 is applied to the kraft paper foundation 302, and when the two halves of foundation 302 are pressed together, the adhesive may come into contact not only with the kraft paper foundation 302, but also with the upholstery cover 308, which is folded around the peripheral edge of foundation 302, as shown in FIG. 20.

Figure 21:
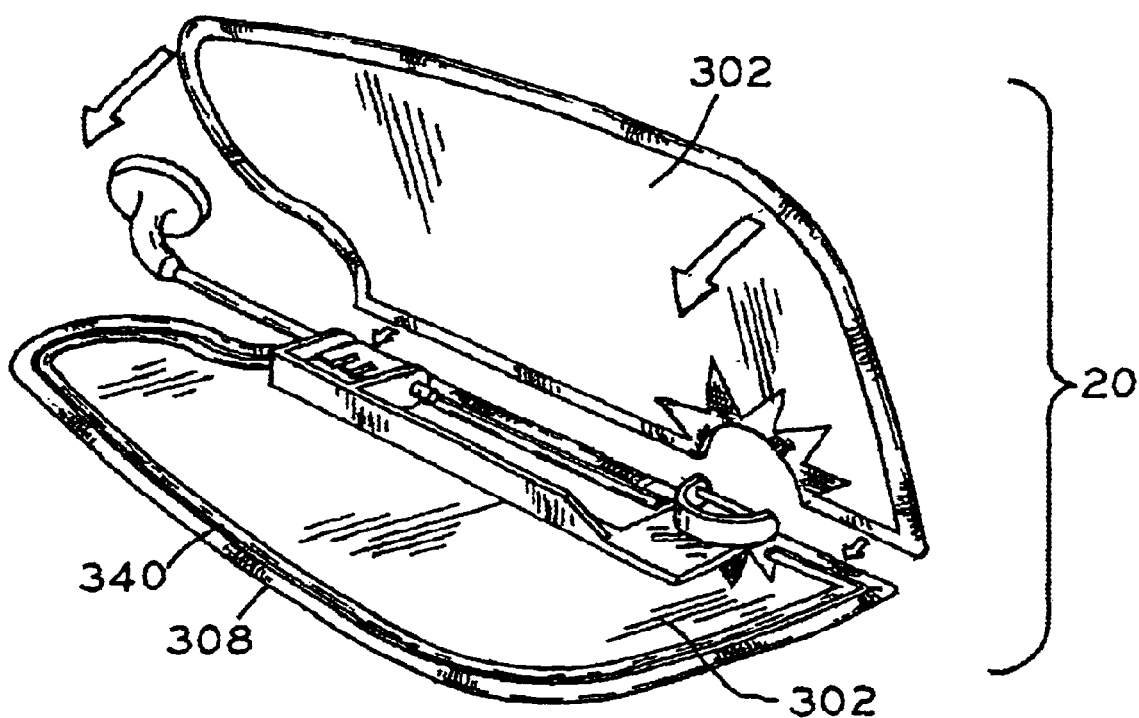
FIG. 21 is a perspective view of a sun visor assembly including two separate foundation halves which may be attached in the same manner as illustrated in FIGS. 19 and 20.
Figure 22:
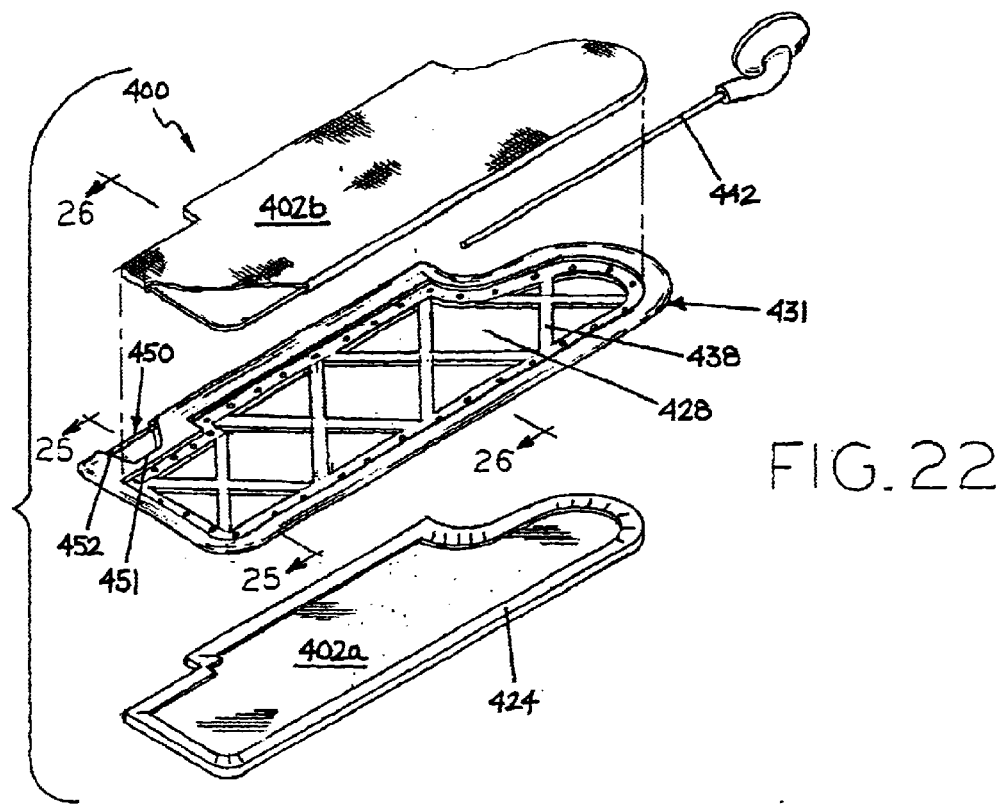
FIG. 22 is an exploded perspective view of a sun visor having two distinct foundation halves.
Figure 24:
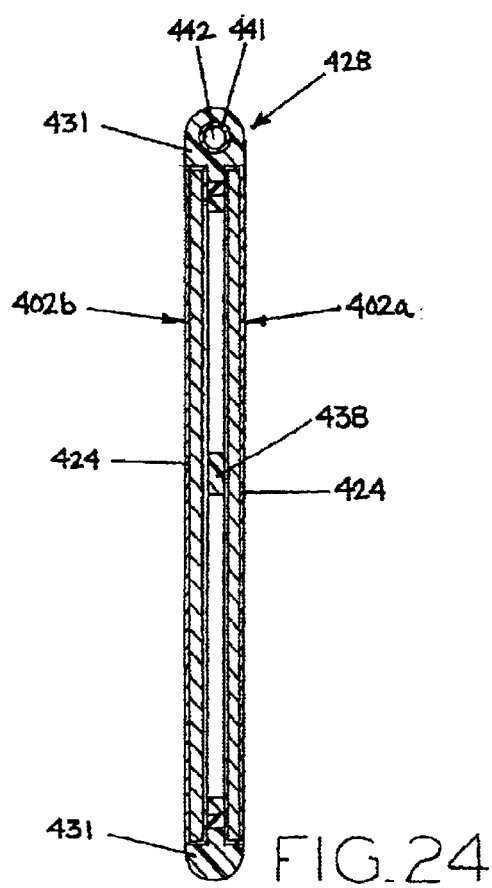
FIG. 24 is a cross sectional view taken along lines 24—24 of FIG. 22.

Alternatively, sun visor assembly 20 may comprise a foundation 402 having two separate halves, as shown in FIGS. 21, 22, and 24. In this instance, the two separate halves of foundation 402 may be adhered together in the same manner as described above.

Figure 19:
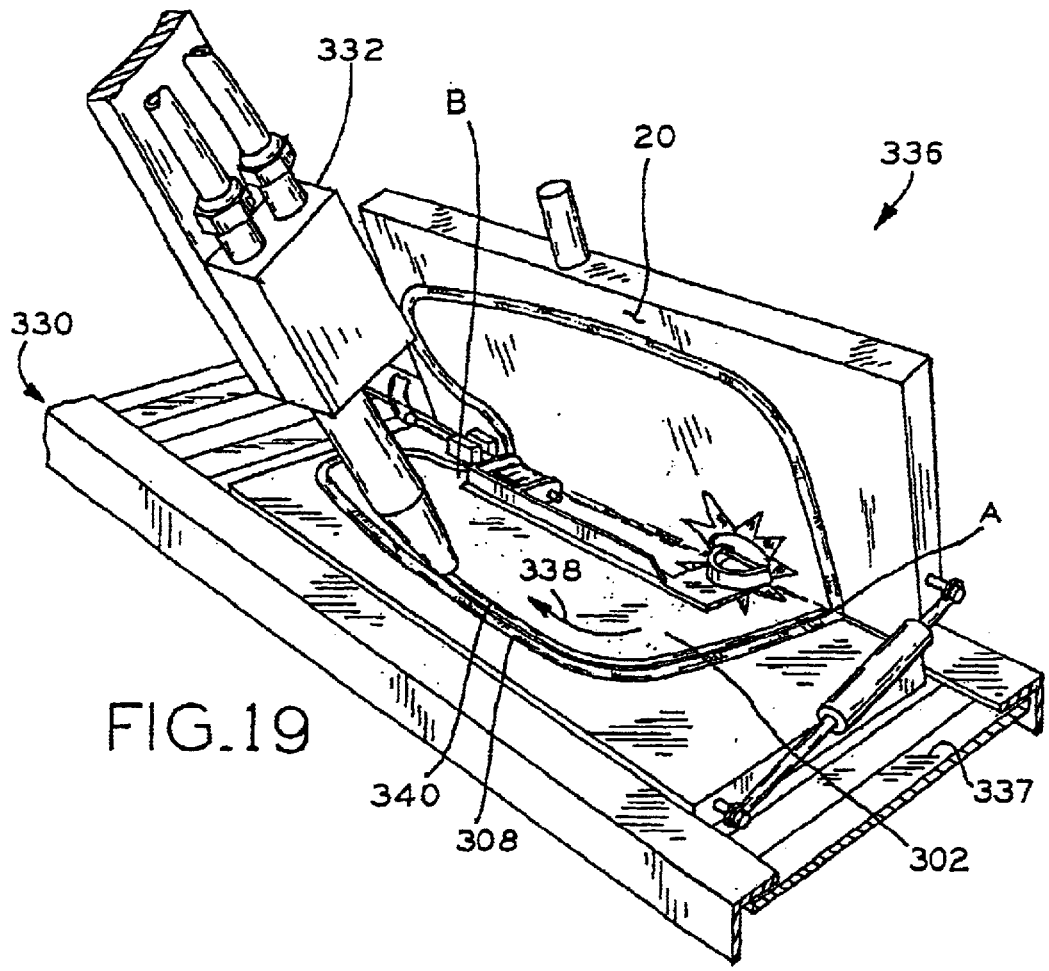
FIG. 19 is a perspective view depicting the application of the non-expanding adhesive to a portion of the foundation of a sun visor assembly.

As shown in FIG. 19, the sun visor assembly is placed in an open position in jig 330, which is associated with an automated assembly 336. Automated assembly 336 is comprised, in part, of a plurality of jigs 330 which are moved along conveyor belt 337. The resin and adhesive components of the non-expanding adhesive are static mixed in a static mixer connected to robotic arm 332. Advantageously, unlike foam adhesives, the catalyst and resin components may be mixed by a static mixer at room temperature, without altering the pressure or other environmental conditions. Jig 330 is presented to robotic arm 332, which applies the non-expanding adhesive 334 along the interior periphery of foundation 302. Robotic arm 332 begins applying the adhesive at point A and continues in the direction of Arrow A 338, until robotic arm 332 reaches point B.

Once the adhesive as been applied as described, robotic arm 332 retracts and jig 330 is closed and moves down conveyor belt 337. The non-expanding adhesive has an initial cure time of at least two minutes, during which time visor assembly 20 must remain in the closed jig 332. After this initial cure time, visor assembly 20 may be removed from jig 332, but must remain unused for at least 24 hours, during which time the adhesive will undergo a complete curing process. The shortened initial cure time is advantageous because the automated assembly 336 may be made shorter by the fact that visor assembly 20 may be removed from jig 332 after only two minutes. Although it is contemplated that this initial cure time could be further shortened, minimal time must be allowed for the completion of any steps which must be performed prior to adhesion.

Turning now to FIG. 22, a sun visor assembly 400 is provided that represents another alternate embodiment of the present invention. As illustrated in FIG. 22, sun visor assembly 400 includes a pair of substantially flat, discreet foundation halves 402a, 402b and a core member 428 disposed between foundation halves 402a, 402b. Core member 428 preferably includes a plurality of reinforcing ribs 438 and a bead member 431 that is disposed around substantially the entire periphery of core member 428, as illustrated in FIG. 22. Bead member 431 comprises a rounded member having a surface that is substantially semicircular in cross section and faces away from sun visor assembly 400.

Figure 23:
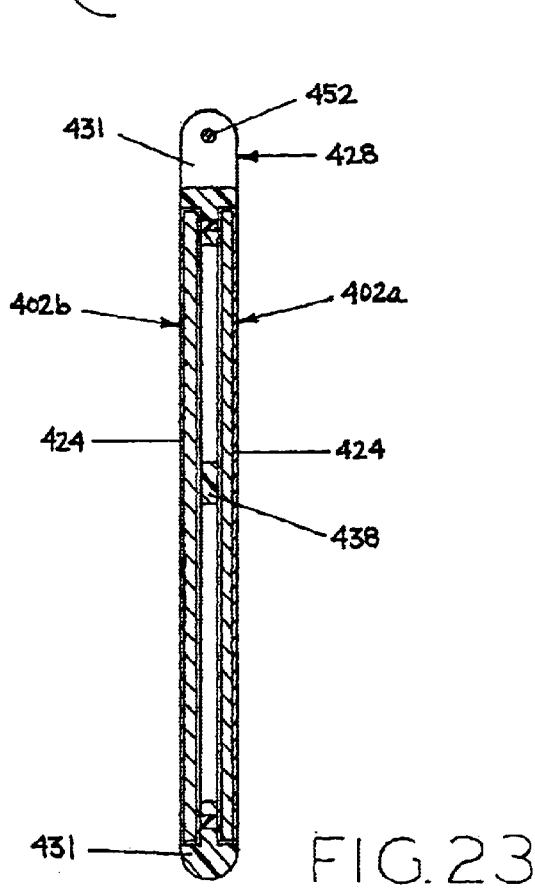
FIG. 23 is a cross sectional view taken along lines 23—23 of FIG. 22.

As illustrated in FIG. 24, bead member 431 includes a hollowed out, elongated cylindrical cavity 441 adapted to receive a support rod 442. As illustrated in FIGS. 22 and 23, bead member 431 further includes a clip assembly 450 having a visor support clip 451 that is integrally formed with bead member 431 and a visor support pin 452. The edge of foundation halves 402a, 402b is advantageously shaped such that no cut-out portion is need to accommodate clip assembly 450.

Foundation halves 402a, 402b are preferably formed of a substantially rigid material, such as hardboard or plastic, but may also be formed of semi-rigid materials such as kraft paper and the like. An upholstery cover 424 covers foundation halves 402a, 402b and forms an exterior surface of visor assembly 400. Foundation halves 402a, 402b are preferably adhered to either side of core member 428 using an non-expanding adhesive disposed about the interior periphery of foundation halves 402a, 402b intermediate foundation halves 402a, 402b and core member 428. Once assembled, foundation halves 402a, 402b, including upholstery cover 424, are substantially flush with bead member 431 to form a substantially uniform surface.

Referring to FIG. 25, a sun visor assembly 500 is provided that represents another alternate embodiment of the present invention. Visor 500 is substantially similar to sun visor assembly 400 with at least one exception, namely, sun visor assembly 500 includes a substantially flat foundation 502 which is folded unto itself to form two foundation halves 503a, 503b. Foundation halves 503a, 503b include an upholstery cover 524 and are adhered to either side of a core member 528. A bead member 531 extends around a substantial portion of the periphery of core member 528, but is discontinued along a frame member 540 to accommodate foundation 502. Frame member 540 includes a hollowed out, elongated cylindrical cavity 541 adapted for holding a support rod 542. An edge of foundation halves 503a, 503b is shaped such that no cut-out portions are needed to accommodate clip assembly 550.

Figure 28:
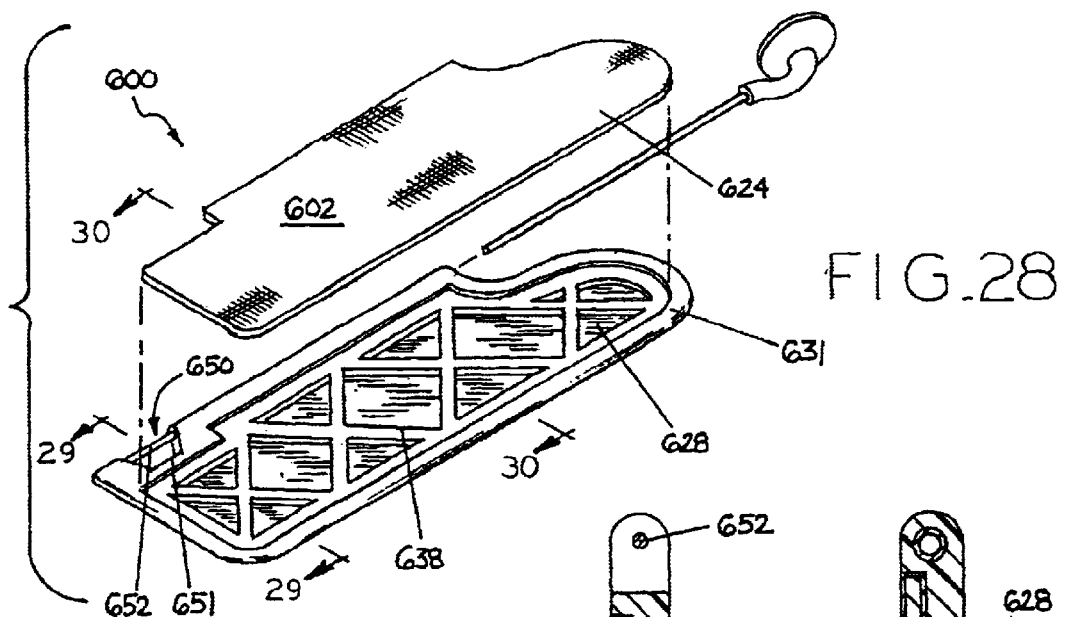
FIG. 28 is an exploded perspective view of a sun visor including a core member and a single foundation half.
Figure 31:
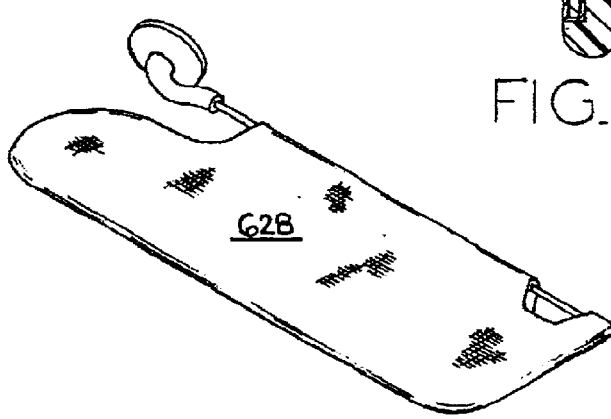
FIG. 31 is a rear perspective view of the sun visor of FIGS. 28–30.

Referring to FIG. 28, a sun visor assembly 600 is provided that represents another alternate embodiment of the present invention. Visor assembly 600 includes a substantially flat foundation member 602 that defines one side of sun visor assembly 600 and a core member 628 that defines the other side of sun visor assembly 600. Core member 628 is preferably manufactured of either a smooth or a textured plastic, or other similar material. FIG. 31 is an illustration of the backside of core member 628 opposite foundation member 602.

Figures 29, 30:
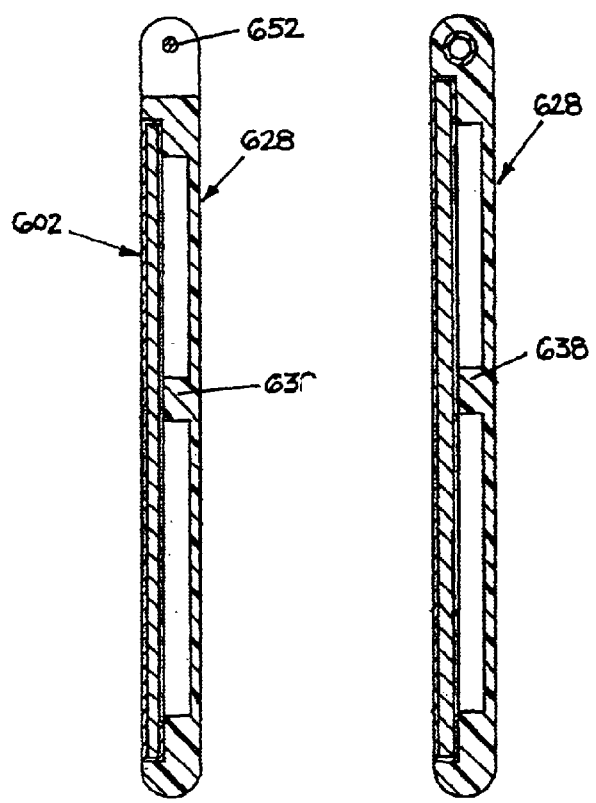
FIG. 29 is a cross sectional view taken along lines 29—29 of FIG. 28.
FIG. 30 is a cross sectional view taken along lines 30—30 of FIG. 28.

As illustrated in FIGS. 28–30, core member 628 preferably includes a plurality of reinforcing ribs 638 and a bead member 631 that is disposed around substantially the entire periphery of core member 628. Bead member may be integrally formed with core member 628 or separately formed and secured to core member 628. Core member 628 further includes a clip assembly 650 having a visor support clip 651 that is integrally formed with bead member 631 and visor support pin 652. Foundation member 602 is covered by an upholstery cover 624 and is shaped such that no cut-out portion is needed to accommodate clip assembly 650.

It can now be appreciated that the design disclosed hereinabove advantageously incorporates the visor clip assembly into the bead member allowing the bead member to be disposed around substantially the entire periphery of the core member, thereby simplifying the manufacturing process. Additionally, there is no need to cut an opening in the foundation for the visor clip assembly, and therefore no need to stretch and pull the upholstery cover through the cut-out portion therein.

It will be appreciated that the foregoing is presented by way of illustration only, and not by way of any limitation, and that various alternatives and modifications may be made to the illustrated embodiment without departing from the spirit and scope of the invention as claimed hereinbelow.

What is claimed is:

1. A sun visor assembly, comprising:
   a substantially flat upholstery covered foundation member that is a first side of said sun visor assembly;
   a core member that is a second side of said sun visor assembly, said second side opposite said first side, said foundation member attached to said core member;
   a bead member disposed around substantially the entire periphery of said core member, said bead member including a rounded surface that is substantially semi-circular in cross-section; and
   a visor support clip integrally formed with said bead member.

2. The sun visor assembly of claim 1, wherein said foundation is substantially flush with said bead member to form a substantially uniform outer surface.

* * * * *